W. Kelly,
Oscillating Steam Engine.
№ 2,670.  Patented June 18, 1842.
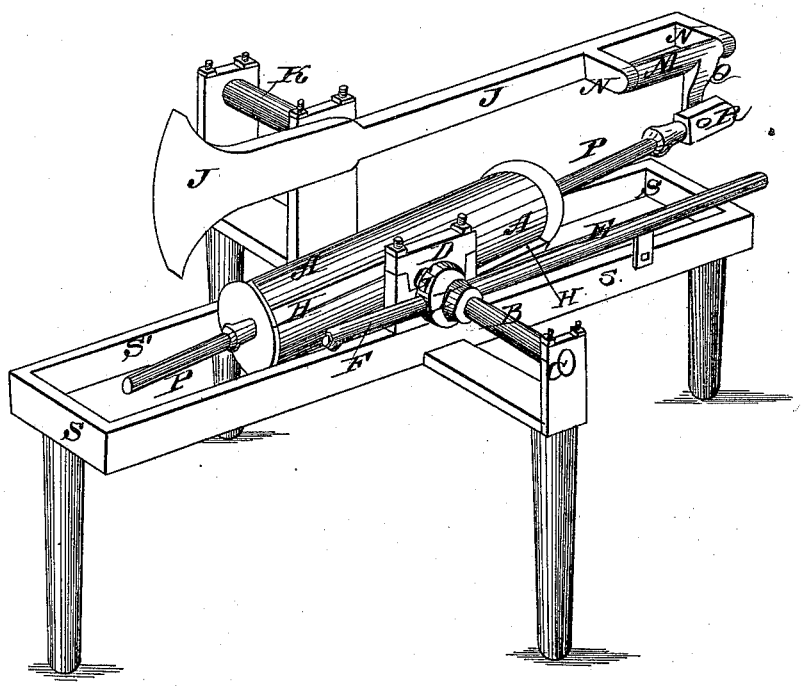

UNITED STATES PATENT OFFICE.

WM. KELLY, OF PITTSBURGH, PENNSYLVANIA.

STEAM-ENGINE.

Specification of Letters Patent No. 2,670, dated June 18, 1842.

*To all whom it may concern:*

Be it known that I, WILLIAM KELLY, of the city of Pittsburgh, in the county of Allegheny and State of Pennsylvania, have invented a new and improved manner of constructing a steam-engine, which improved engine I denominate the rotative reciprocating steam-engine; and I do hereby declare that the following is a full and exact description thereof.

In my steam engine, I use a cylinder having within it a piston attached to a piston rod working through stuffing boxes on the heads of the cylinder, in a manner similar to those employed in the ordinary reciprocating engine; but I give to my said cylinder, piston, and piston rod a continuous rotary motion, and connect the piston rod to a balanced lever, which also has a continuous rotary motion with the cylinder, its axis of rotation being so situated in relation to that upon which the cylinder is affixed as to give to it the attributes of a crank in regulating the reciprocating action of the piston, while the whole revolving system possesses that of a fly wheel. The cylinder has a shaft, or axis, proceeding at right angles from one side of it; at an equal distance between its two ends; this axis is extended out so as to be sustained by two sets of boxes, or plummer blocks, said cylinder being supported on one side only, the opposite side not being furnished with any axis, or other support, it being necessary to leave a free space between it and the frame work, for the revolution of the lever to which the piston rod is attached. The boxes which support the cylinder on that end of its axis of revolution which is in contact with it, constitute a portion of its valve seat, the steam being admitted and discharged through suitable openings, in a manner similar to that adopted in those engines the cylinders of which are made to vibrate on axes or trunnions, and which are well known; or in any of the modes in which rotary valves are employed, and which may be adapted thereto.

The accompanying drawing represents my rotative engine in perspective.

A, A, is the steam cylinder which revolves with its axis B, that is firmly attached to it; the outer end of this axis is sustained by boxes at C, and its inner end by boxes at D. E, and F, are the induction and the eduction pipes, which lead into and from the steam box G, which box remains stationary, and is borne up against a revolving valve seat, furnished with induction and eduction openings that communicate with the steam ways H, H, on the cylinder. I, is a nut which is fitted to a screw cut upon the shaft B, and serving to force the steam box C, against the valve seat, and thus to regulate its pressure; said nut may be kept in place by means of a set screw. The principle of action, and the manner of arranging rotary valves of this description is well known to machinists under their various modifications, and does not constitute any part of my invention.

J, J, is the balanced rotative lever, which is affixed to and revolves with a shaft K, standing at right angles to it and having its bearings in standards L, L. The shaft K, is elevated above the shaft B, to a height equal to that of one-half the stroke of the engine; these two shafts are to stand parallel to each other. M, is a roller which turns on gudgeons in the arms N, N, and makes a part of a vibrating joint placed upon one end of the rotative lever J J. The head O, of the piston rod P, P, is connected to the arms Q, of the vibrating joint by a joint pin at R. By this arrangement, all danger of binding or cramping of the piston resulting from a want of perfect parallelism in the shafts B, and K, or from any other cause, is obviated. The piston rod P, P, passes through both heads of the cylinder, which are furnished with stuffing boxes for that purpose. This provision is necessary to the steady action of the piston.

When the engine is in action, the cylinder A, and the balanced lever J, will both revolve with their shafts B, and K, the cylinder and lever passing within the frame S, S, of the engine, there being a free space for the passage of said lever between the cylinder A and the space S' of the frame.

The power of the engine is to be communicated to the machinery which is to be driven by it, from the axis K, of the lever J; and it will be manifest that although the frame S, which sustains the engine, is represented as standing horizontally, it may be placed vertically, or in any other position that may be preferred.

I am aware that cylinders with vibrating pistons have been made to revolve upon axes or gudgeons in two different engines; one of them invented by Mr. Samuel Morey, and described in the 1st volume of Silliman's Journal, p. 157; the other by Minus Ward, and described in the 4th volume of the same work, p. 90. It will be found, however, when examining the descriptions thereof, that there is but little in common in the construction of my engine, and of the two just named, the arrangement of the operating parts being essentially different in the three. I am not aware of any other engine in which a cylinder with a reciprocating piston is made to revolve.

Having thus fully pointed out the nature of my improvement in the rotative, reciprocating steam engine, and described the manner in which the same operates, what I claim therein as new and desire to secure by Letters Patent is—

The manner of combining the steam cylinder with the balanced lever, so that the two may rotate together, as herein set forth; that is to say, the cylinder and the lever being each sustained by a single revolving axis, or shaft, standing parallel to each other, and at such distance apart as is equal to one half the length of the stroke of the piston; the piston rod being connected to the balanced lever by means of a vibrating joint, constructed in the manner herein described, or in any other that is substantially the same in its operation, and thereby obviating the danger of cramping, or binding as the piston reciprocates back and forth in the cylinder.

WILLIAM KELLY.

Witnesses:
 JOHN F. KELLY,
 W. T. BARR.